US010992358B2

(12) United States Patent
Sirotkin et al.

(10) Patent No.: US 10,992,358 B2
(45) Date of Patent: Apr. 27, 2021

(54) SIGNALING FOR RESOURCE ALLOCATION AND SCHEDULING IN 5G-NR INTEGRATED ACCESS AND BACKHAUL

(71) Applicants: Alexander Sirotkin, Tel-Aviv (IL); Alexei Davydov, Nizhny Novgorod (RU);

(Continued)

(72) Inventors: Alexander Sirotkin, Tel-Aviv (IL); Alexei Davydov, Nizhny Novgorod (RU);

(Continued)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/189,157

(22) Filed: Nov. 13, 2018

(65) Prior Publication Data
US 2019/0222281 A1 Jul. 18, 2019
US 2019/0334600 A9 Oct. 31, 2019

Related U.S. Application Data

(60) Provisional application No. 62/585,210, filed on Nov. 13, 2017, provisional application No. 62/585,381,
(Continued)

(51) Int. Cl.
*H04B 7/06* (2006.01)
*H04L 1/00* (2006.01)
(Continued)

(52) U.S. Cl.
CPC ........ *H04B 7/0626* (2013.01); *H04B 7/0632* (2013.01); *H04B 7/0639* (2013.01);
(Continued)

(58) Field of Classification Search
CPC .. H04B 7/0626; H04B 7/0632; H04B 7/0639; H04W 76/27; H04L 1/0026
See application file for complete search history.

(56) References Cited

U.S. PATENT DOCUMENTS

2013/0077514 A1* 3/2013 Dinan .................. H04L 5/0057
370/252
2015/0365209 A1* 12/2015 Yi .......................... H04L 5/001
370/329
(Continued)

OTHER PUBLICATIONS

3GPP TS 38.214 V1.0.0 (Sep. 2017) 3rd Generation Partnership Project; Technical Specification Group Radio Access Network; NR; Physical layer procedures for data Release 15) (Year: 2017).*
(Continued)

*Primary Examiner* — Gary Mui
(74) *Attorney, Agent, or Firm* — Kowert, Hood, Munyon, Rankin & Goetzel, P.C.

(57) ABSTRACT

Embodiments of apparatus and methods for signaling for resource allocation and scheduling in 5G-NR integrated access and backhaul are generally described herein. In some embodiments, User Equipment configured for reporting a channel quality indicator (CQI) index in a channel state information (CSI) reference resource assumes a physical resource block (PRB) bundling size of two PRBs to derive the CQI index.

20 Claims, 5 Drawing Sheets

(71) Applicants: Andrey Chervyakov, Nizhny Novgorod (RU); Anthony Lee, San Diego, CA (US); Avik Sengupta, San Jose, CA (US); Bharat Shrestha, Hillsboro, OR (US); Candy Yiu, Portland, OR (US); Chang Hong Shan, Portland, OR (US); Dae Won Lee, Portland, OR (US); Dawei Ying, Hillsboro, OR (US); Debdeep Chatterjee, San Jose, CA (US); Farid Adrangi, Lake Oswego, OR (US); Gang Xiong, Beaverton, OR (US); Geng Wu, Portland, OR (US); Gregory Morozov, Nizhny Novgorod (RU); Hassan Ghozlan, Hillsboro, OR (US); Hong He, Beijing (CN); Honglei Miao, Nuremberg (DE); Hua Li, Arlington, VA (US); Jaemin Han, Hillsboro, OR (US); Jeongho Jeon, San Jose, CA (US); Jie Cui, Santa Clara, CA (US); Jing Zhu, Portland, OR (US); Joey Chou, Scottsdale, AZ (US); Joonbeom Kim, Carrollton, TX (US); Joonyoung Cho, Santa Clara, CA (US); Kathiravetpillai Sivanesan, Portland, OR (US); Lu Lu, Hillsboro, OR (US); May Wu, Shanghai (CN); Naveen Palle, San Diego, CA (US); Puneet Jain, Hillsboro, OR (US); Qian Li, Beaverton, OR (US); Richard C. Burbidge, Shrivenham (GB); Robert Zaus, Munich (DE); Rui Huang, Beijing (CN); Satish Chandra Jha, Hillsboro, OR (US); Seau S. Lim, Swindon (GB); Sergey Panteleev, Nizhny Novgorod (RU); Song Noh, Hillsboro, OR (US); Yaser M. Fouad, Hillsboro, OR (US); Yi Guo, Santa Clara, CA (US); Yizhi Yao, Chandler, AZ (US); Yongjun Kwak, Portland, OR (US); Youn Hyoung Heo, San Jose, CA (US); Yuhan Zhou, Santa Clara, CA (US); Yujian Zhang, Beijing (CN); Yushu Zhang, Beijing (CN)

(72) Inventors: Andrey Chervyakov, Nizhny Novgorod (RU); Anthony Lee, San Diego, CA (US); Avik Sengupta, San Jose, CA (US); Bharat Shrestha, Hillsboro, OR (US); Candy Yiu, Portland, OR (US); Chang Hong Shan, Portland, OR (US); Dae Won Lee, Portland, OR (US); Dawei Ying, Hillsboro, OR (US); Debdeep Chatterjee, San Jose, CA (US); Farid Adrangi, Lake Oswego, OR (US); Gang Xiong, Beaverton, OR (US); Geng Wu, Portland, OR (US); Gregory Morozov, Nizhny Novgorod (RU); Hassan Ghozlan, Hillsboro, OR (US); Hong He, Beijing (CN); Honglei Miao, Nuremberg (DE); Hua Li, Arlington, VA (US); Jaemin Han, Hillsboro, OR (US); Jeongho Jeon, San Jose, CA (US); Jie Cui, Santa Clara, CA (US); Jing Zhu, Portland, OR (US); Joey Chou, Scottsdale, AZ (US); Joonbeom Kim, Carrollton, TX (US); Joonyoung Cho, Santa Clara, CA (US); Kathiravetpillai Sivanesan, Portland, OR (US); Lu Lu, Hillsboro, OR (US); May Wu, Shanghai (CN); Naveen Palle, San Diego, CA (US); Puneet Jain, Hillsboro, OR (US); Qian Li, Beaverton, OR (US); Richard C. Burbidge, Shrivenham (GB); Robert Zaus, Munich (DE); Rui Huang, Beijing (CN); Satish Chandra Jha, Hillsboro, OR (US); Seau S. Lim, Swindon (GB); Sergey Panteleev, Nizhny Novgorod (RU); Song Noh, Hillsboro, OR (US); Yaser M. Fouad, Hillsboro, OR (US); Yi Guo, Santa Clara, CA (US); Yizhi Yao, Chandler, AZ (US); Yongjun Kwak, Portland, OR (US); Youn Hyoung Heo, San Jose, CA (US); Yuhan Zhou, Santa Clara, CA (US); Yujian Zhang, Beijing (CN); Yushu Zhang, Beijing (CN)

Related U.S. Application Data filed on Nov. 13, 2017, provisional application No. 62/585,907, filed on Nov. 14, 2017, provisional application No. 62/585,909, filed on Nov. 14, 2017, provisional application No. 62/586,758, filed on Nov. 15, 2017, provisional application No. 62/587,234, filed on Nov. 16, 2017, provisional application No. 62/587,354, filed on Nov. 16, 2017, provisional application No. 62/587,385, filed on Nov. 16, 2017, provisional application No. 62/587,387, filed on Nov. 16, 2017, provisional application No. 62/587,401, filed on Nov. 16, 2017, provisional application No. 62/588,042, filed on Nov. 17, 2017, provisional application No. 62/588,238, filed on Nov. 17, 2017, provisional application No. 62/588,240, filed on Nov. 17, 2017, provisional application No. 62/588,258, filed on Nov. 17, 2017, provisional application No. 62/590,993, filed on Nov. 27, 2017, provisional application No. 62/590,996, filed on Nov. 27, 2017, provisional application No. 62/591,068, filed on Nov. 27, 2017, provisional application No. 62/591,579, filed on Nov. 28, 2017, provisional application No. 62/593,775, filed on Dec. 1, 2017, provisional application No. 62/593,781, filed on Dec. 1, 2017, provisional application No. 62/593,811, filed on Dec. 1, 2017, provisional application No. 62/596,432, filed on Dec. 8, 2017, provisional application No. 62/597,264, filed on Dec. 11, 2017, provisional application No. 62/597,265, filed on Dec. 11, 2017, provisional application No. 62/597,760, filed on Dec. 12, 2017, provisional application No. 62/607,487, filed on Dec. 20, 2017, provisional application No. 62/608,488, filed on Dec. 20, 2017, provisional application No. 62/612,152, filed on Dec. 29, 2017, provisional application No. 62/623,265, filed on Jan. 29, 2018, provisional application No. 62/625,780, filed on Feb. 2, 2018.

(51) Int. Cl.
*H04W 76/27* (2018.01)
*H04W 72/12* (2009.01)

| | | |
|---|---|---|
| H04W 80/08 | (2009.01) | |
| H04B 7/0456 | (2017.01) | |

(52) U.S. Cl.
CPC ....... *H04L 1/0026* (2013.01); *H04W 72/1284* (2013.01); *H04W 76/27* (2018.02); *H04B 7/0482* (2013.01); *H04W 80/08* (2013.01)

(56) References Cited

U.S. PATENT DOCUMENTS

| | | | | |
|---|---|---|---|---|
| 2016/0020847 A1* | 1/2016 | Jitsukawa | ............. | H04W 16/28 370/329 |
| 2016/0043792 A1* | 2/2016 | Jeong | ....................... | H01Q 3/34 370/328 |
| 2017/0288808 A1* | 10/2017 | Blankenship | ....... | H04L 27/2607 |
| 2018/0219664 A1* | 8/2018 | Guo | ................... | H04B 17/318 |
| 2018/0227156 A1* | 8/2018 | Papasakellariou | ....... | H04B 7/12 |
| 2019/0036574 A1* | 1/2019 | Zhu | ..................... | H04B 7/0417 |
| 2019/0053084 A1* | 2/2019 | Hosseini | ............. | H04B 7/0626 |
| 2019/0141693 A1* | 5/2019 | Guo | ......................... | H04B 7/00 |
| 2019/0215710 A1* | 7/2019 | Yi | .......................... | H04B 1/713 |
| 2019/0260501 A1* | 8/2019 | Kim | ......................... | H04L 1/00 |

OTHER PUBLICATIONS

"Frame structure for new radio interface", 3GPP TSG RAN WG1 Meeting #84bis R1-162726, (Apr. 2016), 5 pgs.

"Subframe structure forNR dynamic TDD", 3GPP TSG RAN1 WG Meeting #87 R1-1612005, (Nov. 2016), 8 pgs.

Islam, Muhammad Nazmul, et al., "Integrated Access Backhaul in Millimeter Wave Networks", 2017 IEEE Wireless Communications and Networking Conference (WCNC), (Mar. 2017), 6 pgs.

Morgensen, P, et al., "5G small cell optimized radio design", IEEE Globecom Workshops (GC Workshops), (2013), 6 pgs.

Saha, Chiranjib, et al., "Integrated mmWave Accessand Backhaul in 5G: Bandwidth Partitioning and Downlink Analysis", Cornell University arXiv:1710,06255, (Oct. 17, 2017), 6 pgs.

Sharma, Ankit, et al., "Joint backhaul-accessanalysisof full duplexself-backhauling heterogeneous networks", IEEE Transactionson WirelessCommunications vol. 16, No. 3, (2017), 1727-1740.

* cited by examiner

SIGNALING FOR RESOURCE ALLOCATION AND SCHEDULING IN 5G-NR INTEGRATED ACCESS AND BACKHAUL

PRIORITY CLAIMS

This application claims priority under 35 U.S.C. 119(e) to the following United States Provisional Patent Applications which are in incorporated herein by reference in their entirety:

| Serial # | Date Filed | Reference No. |
|---|---|---|
| 62/587,385 | Nov. 16, 2017 | AA6222-Z |
| 62/587,387 | Nov. 16, 2017 | AA6355-Z |
| 62/587,401 | Nov. 16, 2017 | AA6406-Z |
| 62/585,381 | Nov. 13, 2017 | AA6187-Z |
| 62/590,996 | Nov. 27, 2017 | AA6613-Z |
| 62/590,993 | Nov. 27, 2017 | AA6656-Z |
| 62/587,354 | Nov. 16, 2017 | AA6303-Z |
| 62/588,240 | Nov. 17, 2017 | AA6442-Z |
| 62/588,238 | Nov. 17, 2017 | AA6441-Z |
| 62/608,488 | Dec. 20, 2017 | AA7354-Z |
| 62/585,909 | Nov. 14, 2017 | AA6240-Z |
| 62/588,258 | Nov. 17, 2017 | AA6460-Z |
| 62/591,068 | Nov. 27, 2017 | AA6628-Z |
| 62/612,152 | Dec. 29, 2017 | AA7567-Z |
| 62/597,264 | Dec. 11, 2017 | AA6961-Z |
| 62/597,760 | Dec. 12, 2017 | AA6996-Z |
| 62/586,758 | Nov. 15, 2017 | AA6254-Z |
| 62/588,042 | Nov. 17, 2017 | AA6389-Z |
| 62/608,487 | Dec. 20, 2017 | AA7306-Z |
| 62/593,811 | Dec. 1, 2017 | AA6605-Z |
| 62/593,781 | Dec. 1, 2017 | AA6604-Z |
| 62/593,775 | Dec. 1, 2017 | AA6072-Z |
| 62/591,579 | Nov. 28, 2017 | AA6567-Z |
| 62/585,210 | Nov. 13, 2017 | AA6112-Z |
| 62/585,907 | Nov. 14, 2017 | AA6239-Z |
| 62/597,265 | Dec. 11, 2017 | AA7001-Z |
| 62/587,234 | Nov. 16, 2017 | AA6314-Z |
| 62/596,432 | Dec. 8, 2017 | AA6563-Z |

TECHNICAL FIELD

Various embodiments generally may relate to the field of wireless communications. Some embodiments relate to cellular communication systems and networks including fifth generation (5G) new radio (NR) (5G-NR) networks and devices.

BACKGROUND

There are many issues related to operations in radio access network (RAN)s including fifth generation (5G) new radio (NR) (5G-NR) networks and devices.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Figure 1A:
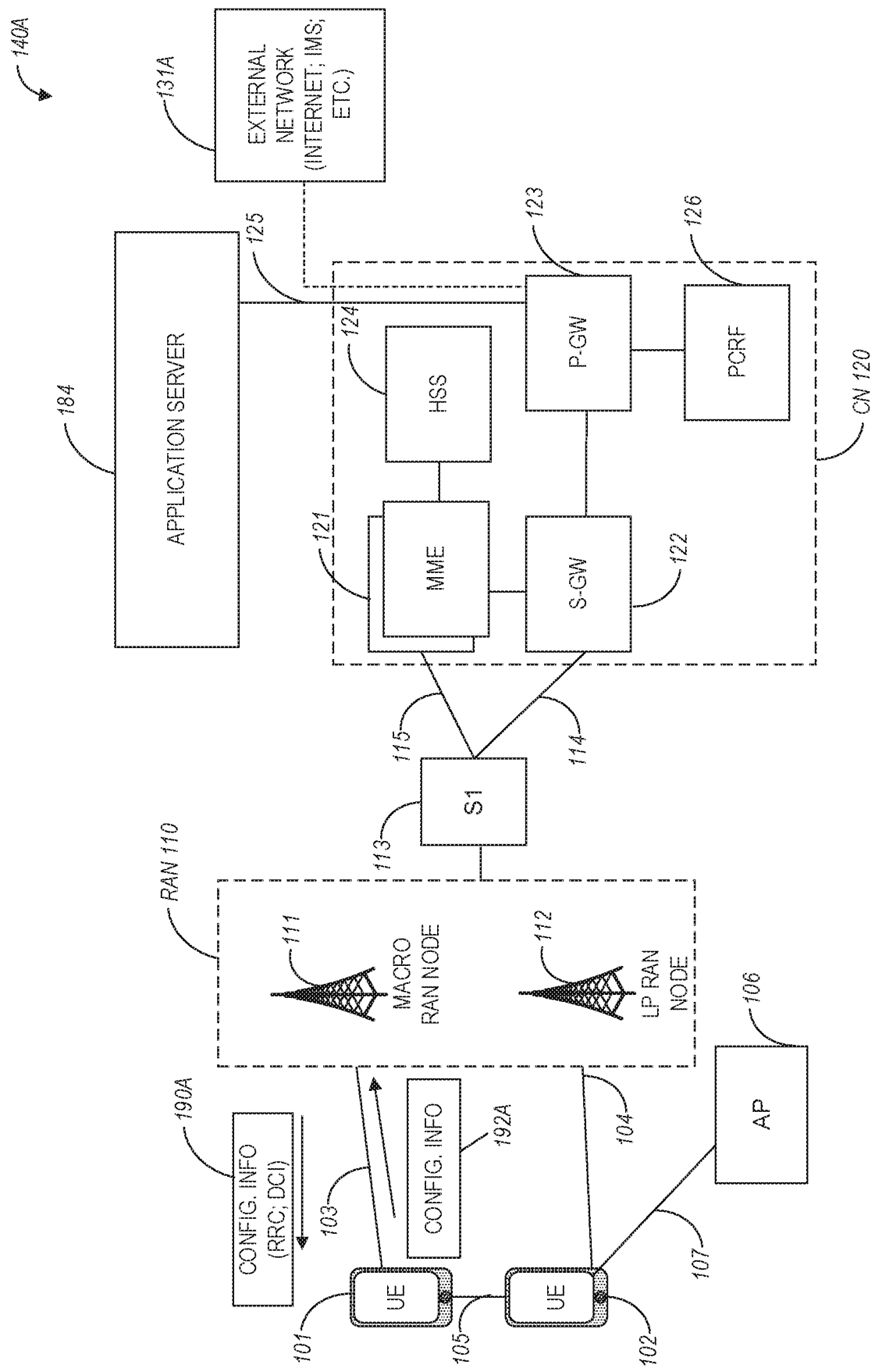
FIG. 1A illustrates an architecture of a network, in accordance with some embodiments.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

In some embodiments, UEs 101 and/or 102 may be configured for reporting a channel quality indicator (CQI) index in a channel state information (CSI) reference resource assumes a physical resource block (PRB) bundling size of two PRBs to derive the CQI index. These embodiments are described in more detail below.

Any of the radio links described herein (e.g., as used in the network 140A or any other illustrated network) may operate according to any exemplary radio communication technology and/or standard. LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT LIE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, NB-IoT devices can be configured to operate in a single physical resource block (PRB) and may be instructed to retune two different PRBs within the system bandwidth. In some embodiments, an eNB-IoT UE can be configured to acquire system information in one PRB, and then it can retune to a different PRB to receive or transmit data.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some embodiments, the network 140A can include a core network (CN) 120. Various embodiments of NG RAN and NG Core are discussed herein in reference to, e.g., FIG. 1B, FIG. 1C, and FIG. 1D.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although these are not requirements for all aspects. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some embodiments, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some embodiments, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-firmed GSM spectrum); (b) in-band deployment (the network operates within the LTE channel); and (c) guard-band deployment (the network operates in the guard band of legacy LTE channels). In some embodiments, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macro-cells, and, consequently, the DL coverage can be affected and/or reduced. In addition, some NB-IoT UEs can be configured to transmit at maximum power if repetitions are used for UL, transmission. This may result in large inter-cell interference in dense small cell deployments.

In some embodiments, the UE 101 can operate in dual connectivity (DC) configuration with a master node (MN) and a secondary node (SN). The UE 101 can receive configuration information 190A (from MN or SN) via, e.g., higher layer signaling or other types of signaling. The configuration information 190A can include an indication for renegotiation of UE NR security capability, which can be used for activation of encryption/decryption and integrity protection of user plane traffic with the SN and control plane signaling traffic with the MN or the SN. In some embodiments, the configuration information 190A can be communicated directly by the SN via signaling radio bearer type 3 (SRB3) connection. In some embodiments, configuration information 192A can be communicated from the UE 101 to the SN or the MN for purposes of activation of encryption/ decryption and integrity protection of user plane and control plane communications. For example, configuration information 192A can include UE NR DC token which can be used in secure key derivation for protecting the user plane and control plane communications.

Figure 1B:
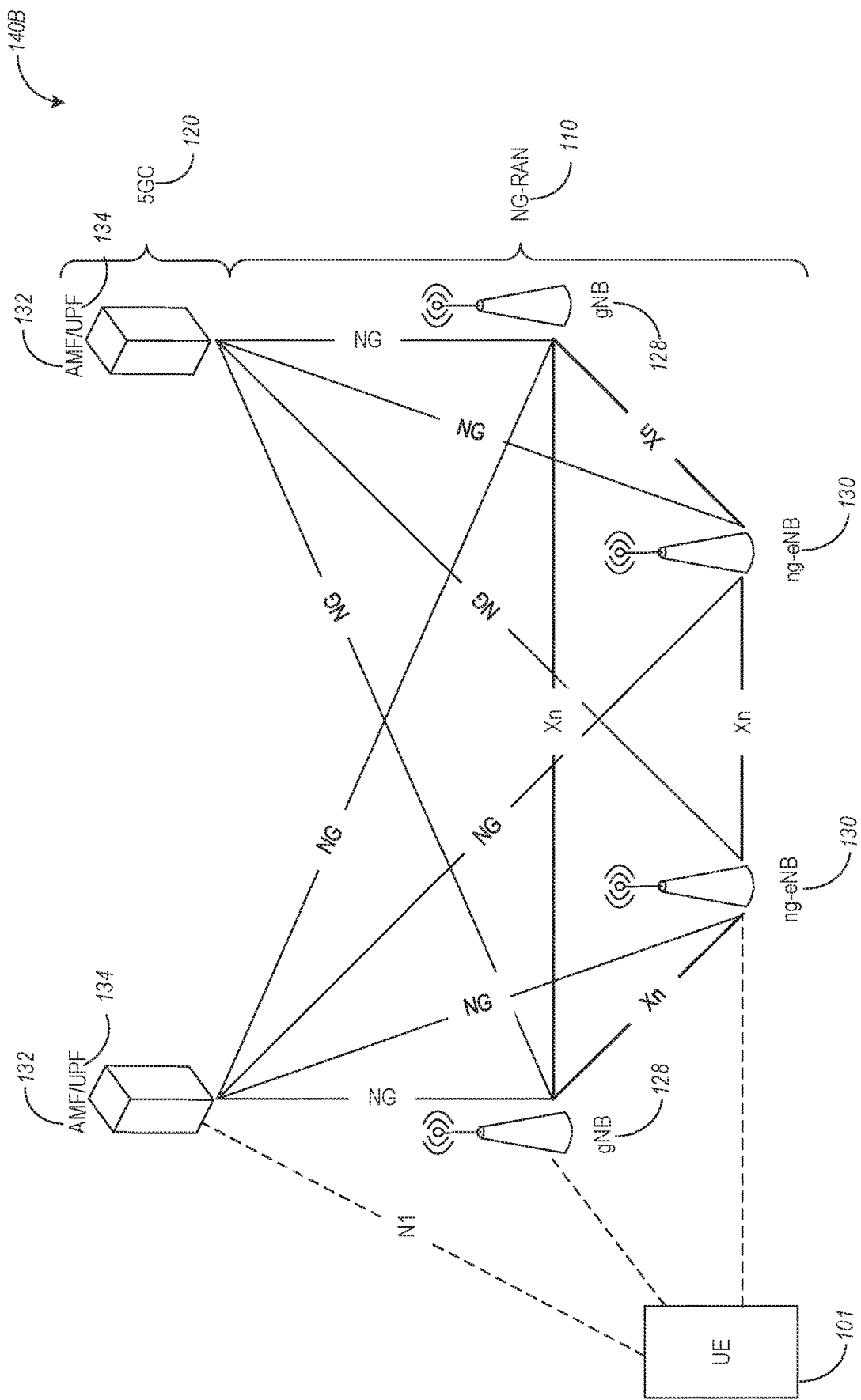
FIG. 1B is a simplified diagram of an overall next generation (NG) system architecture, in accordance with some embodiments.

FIG. 1B is a simplified diagram of a next generation (NG) system architecture 140B in accordance with some embodiments. Referring to FIG. 113, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some embodiments, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some embodiments, a gNB 128 can include a node providing new radio (NR) user plane and control plane protocol termination towards the UE and is connected via the NG interface to the 5GC 120. In some embodiments, an NG-eNB 130 can include a node providing evolved universal terrestrial radio access (E-UTRA) user plane and control plane protocol terminations towards the UE and is connected via the NG interface to the 5GC 120.

In some embodiments, the NG system architecture 140B can use reference points between various nodes as provided by 3GPP Technical Specification (TS) 23.501 (e.g., V15.4.0, 2018-12).

In some embodiments, each of the gNBs 128 and the NG-eNBs 130 can be implemented as a base station, a mobile edge server, a small cell, a home eNB, anti so forth.

In some embodiments, node 128 can be a master node (MN) and node 130 can be a secondary node (SN) in a 5G architecture. The MN 128 can be connected to the AMF 132 via an NG-C interface and to the SN 128 via an XN-C interface. The MN 128 can be connected to the UPF 134 via an NG-U interface and to the SN 128 via an XN-U interface.

Figure 1C:
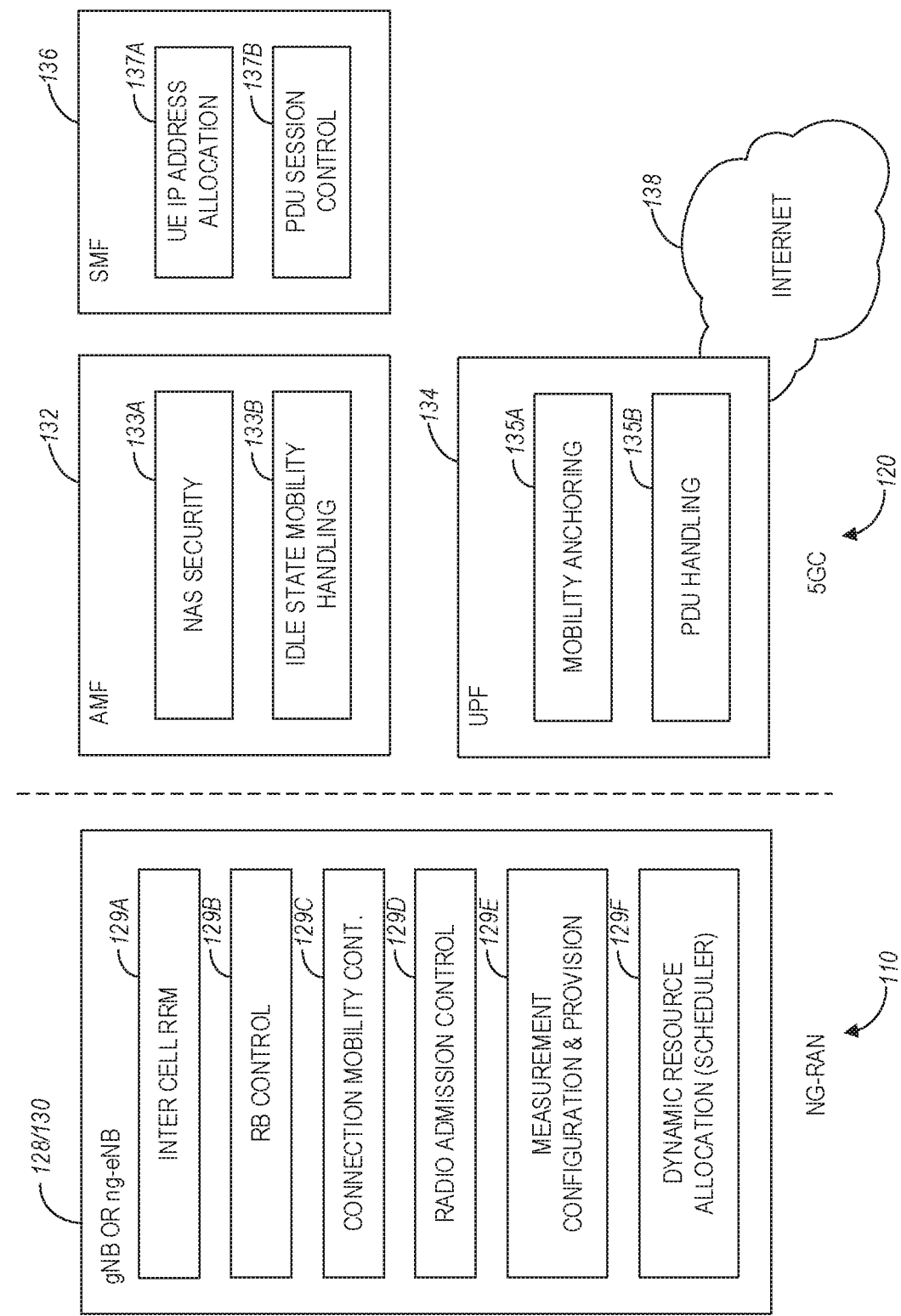
FIG. 1C illustrates a functional split between next generation radio access network (NG-RAN) and the 5G Core network (5GC), in accordance with some embodiments.

FIG. 1C illustrates a functional split between NG-RAN and the 5G Core (5GC) in accordance with some embodiments. Referring to FIG. 1C, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some embodiments, the 5GC 120 can provide access to the Internet 138 to one or more devices via the NG-RAN 110.

In some embodiments, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F); IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC_INACTIVE state; distribution function for non-access stratum (NAS) messages; radio access network sharing; dual connectivity; and tight interworking between NR and E-UTRA, to name a few.

In some embodiments, the AMF 132 can be configured to host the following functions, for example: NAS signaling termination; NAS signaling security 133A; access stratum (AS) security control; inter-core network (CN) node signaling for mobility between 3GPP access networks; idle state/ mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane part of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Figure 1D:
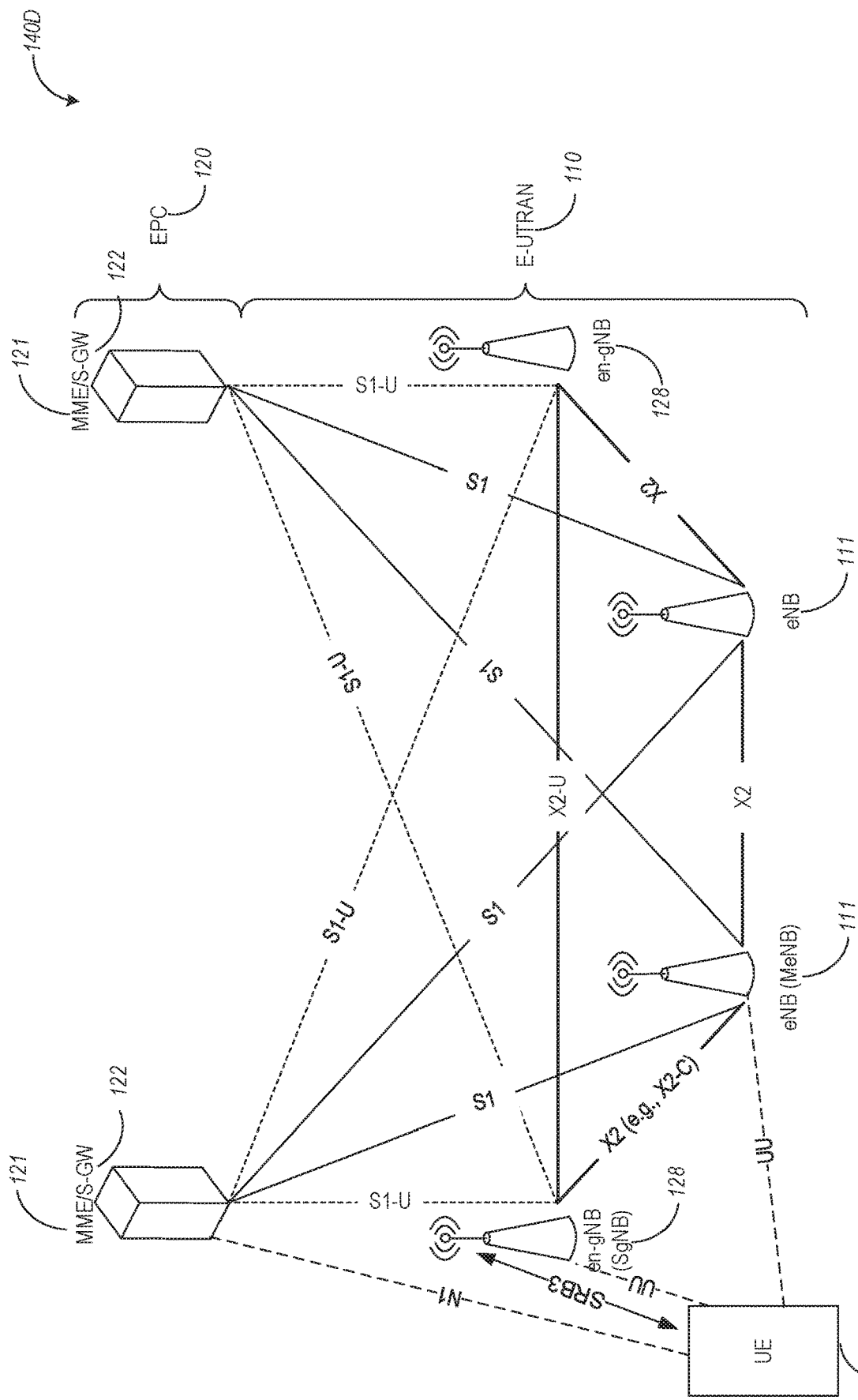
FIG. 1D illustrates an example Evolved Universal Terrestrial Radio Access (E-UTRA) New Radio Dual Connectivity (EN-DC) architecture, in accordance with some embodiments.

FIG. 1D illustrates an example Evolved Universal Terrestrial Radio Access (E-UTRA) New Radio Dual Connectivity (EN-DC) architecture, in accordance with some embodiments. Referring to FIG. 1D, the EN-DC architecture 140D includes radio access network (or E-TRA network, or E-TRAN) 110 and EPC 120. The EPC 120 can include MMEs 121 and S-GWs 122. The E-UTRAN 110 can include nodes 111 (e.g., eNBs) as well as Evolved Universal Terrestrial Radio Access New Radio (EN) next generation evolved Node-Bs (en-gNBs) 128.

In some embodiments, en-gNBs 128 can be configured to provide NR user plane and control plane protocol terminations towards the UE 102 and acting as Secondary Nodes (or SgNBs) in the EN-DC communication architecture 140D. The eNBs 111 can be configured as master nodes (or MeNBs) and the eNBs 128 can be configured as secondary nodes (or SgNBs) in the EN-DC communication architecture 140D. As illustrated in FIG. 1D, the eNBs 111 are connected to the EPC 120 via the S1 interface and to the EN-gNBs 128 via the X2 interface. The EN-gNBs (or SgNBs) 128 may be connected to the EPC 120 via the S1-U interface, and to other EN-gNBs via the X2-U interface. The SgNB 128 can communicate with the UE 102 via a UU interface (e.g., using signaling radio bearer type 3, or SRB3 communications as illustrated in FIG. 1D), and with the MeNB 111 via an X2 interface (e.g., X2-C interface). The MeNB 111 can communicate with the UE 102 via a UU interface.

Even though FIG. 1D is described in connection with EN-DC communication environment, other types of dual connectivity communication architectures (e.g., when the UE 102 is connected to a master node and a secondary node) can also use the techniques disclosed herein.

In some embodiments, the MeNB 111 can be connected to the MME 121 via S1-MME interface and to the SgNB 128 via an X2-C interface. In some embodiments, the MeNB 111 can be connected to the SGW 122 via S1-U interface and to the SgNB 128 via an X2-U interface. In some embodiments associated with dual connectivity (DC) and/or MultiRate-DC (MR-DC), the Master eNB (MeNB) can offload user plane traffic to the Secondary gNB (SgNB) via split bearer or SCG (Secondary Cell Group) split bearer.

In some embodiments, a UE is configured for reporting a channel quality indicator (CQI) index in a channel state information (CSI) reference resource. In these embodiments, the UE may assume a physical resource block (PRB) bundling size of two PRBs to derive the CQI index. These embodiments are described in more detail below.

Figure 2:
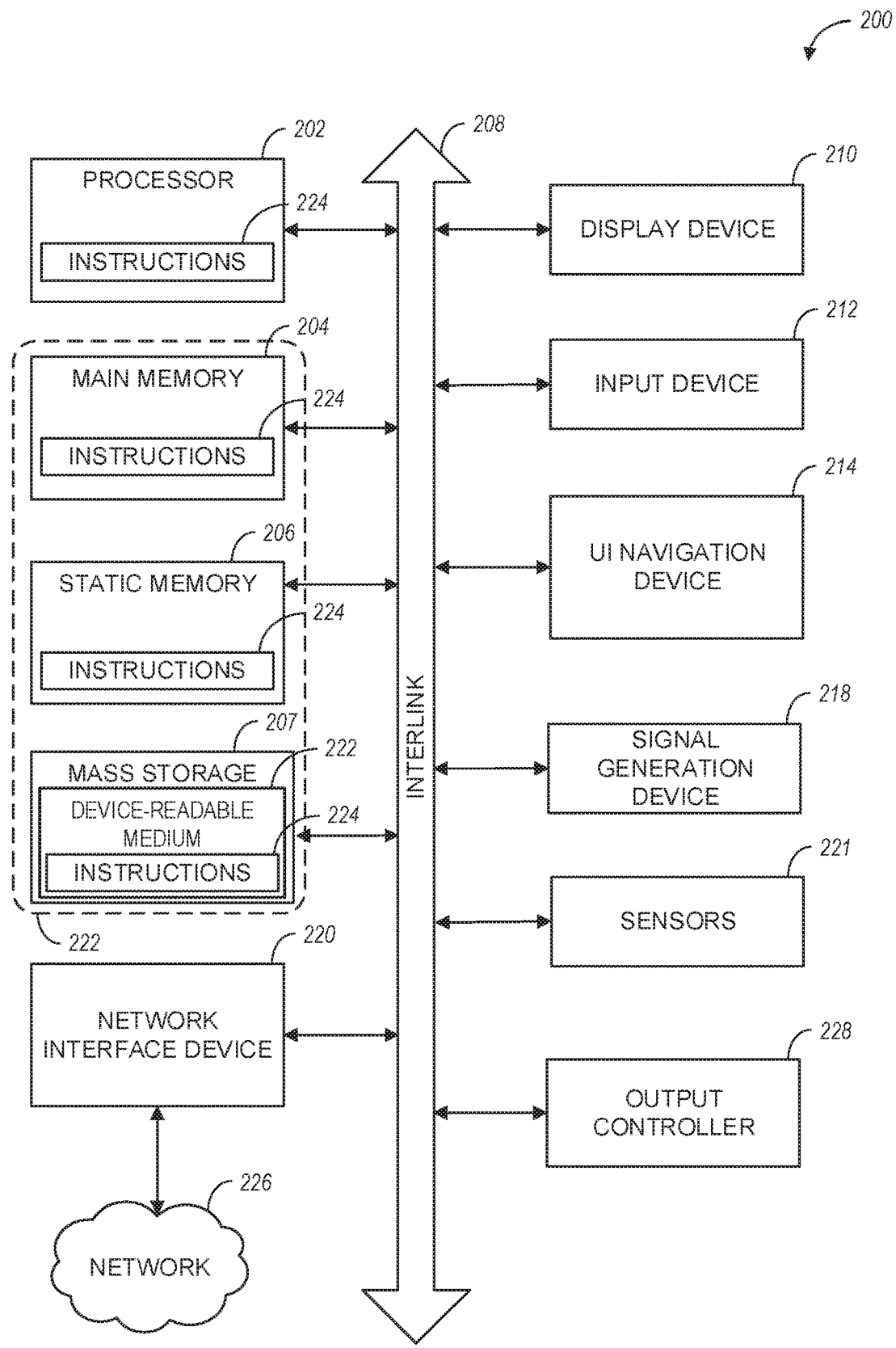
FIG. 2 illustrates a block diagram of a communication device in accordance with some embodiments.

FIG. 2 illustrates a block diagram of a communication device in accordance with some embodiments and to perform one or more of the techniques disclosed herein. In some embodiments, communication device 200 may be an evolved Node-B (eNB), a new generation Node-B (gNB), an access point (AP), a wireless station (STA), a mobile station (MS), or a user equipment (UE). In embodiments, the communication device 200 may operate as a standalone device or may be connected (e.g., networked) to other communication devices.

Circuitry (e.g., processing circuitry) is a collection of circuits implemented intangible entities of the device 200 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 200 follow.

In some embodiments, the device 200 may operate as a standalone device or may be connected (e.g., networked) to other devices. In a networked deployment, the communication device 200 may operate in the capacity of a server communication device, a client communication device, or both in server-client network environments. In an example, the communication device 200 may act as a peer communication device in peer-to-peer (P2P) (or other distributed) network environment. The communication device 200 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Communication device (e.g., UE) 200 may include a hardware processor 202 (e.g., a central processing unit (CPU), a graphics processing unit (GPU), a hardware processor core, or any combination thereof), a main memory 204, a static memory 206, and mass storage 207 (e.g., hard drive, tape drive, flash storage, or other block or storage devices), some or all of which may communicate with each other via an interlink (e.g., bus) 208.

The communication device 200 may further include a display device 210, an alphanumeric input device 212 (e.g., a keyboard), and a user interface (UI) navigation device 214 (e.g., a mouse). In an example, the display device 210, input device 212 and UI navigation device 214 may be a touchscreen display. The communication device 200 may additionally include a signal generation device 218 (e.g., a speaker), a network interface device 220, and one or more sensors 221, such as a global positioning system (GPS) sensor, compass, accelerometer, or another sensor. The communication device 200 may include an output controller 228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 207 may include a communication device-readable medium 222, on which is stored one or more sets of data structures or instructions 224 (e.g., software) embodying or utilized by any one or more of the techniques or functions described herein. In some embodiments, registers of the processor 202, the main memory 204, the static memory 206, and/or the mass storage 207 may be, or include (completely or at least partially), the device-readable medium 222, on which is stored the one or more sets of data structures or instructions 224, embodying or utilized by any one or more of the techniques or functions described herein. In an example, one or any combination of the hardware processor 202, the main memory 204, the static memory 206, or the mass storage 216 may constitute the device-readable medium 222.

As used herein, the term "device-readable medium" is interchangeable with "computer-readable medium" or "machine-readable medium". While the communication device-readable medium 222 is illustrated as a single medium, the term "communication device-readable medium" may include a single medium or multiple media (e.g., a centralized or distributed database, and/or associated caches and servers) configured to store the one or more instructions 224.

The term "communication device-readable medium" may include any medium that is capable of storing, encoding, or carrying instructions (e.g., instructions 224) for execution by the communication device 200 and that cause the communication device 200 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

The instructions 224 may further be transmitted or received over a communications network 226 using a transmission medium via the network interface device 220 utilizing any one of a number of transfer protocols. In an example, the network interface device 220 may include one or more physical jacks (e.g., Ethernet, coaxial, or phone jacks) or one or more antennas to connect to the communications network 226. In an example, the network interface device 220 may include a plurality of antennas to wirelessly communicate using at least one of single-input-multiple-output (SIMO), MIMO, or multiple-input-single-output (MISO) techniques. In some examples, the network interface device 220 may wirelessly communicate using Multiple User MIMO techniques.

The term "transmission medium" shall be taken to include any intangible medium that is capable of storing, encoding or carrying instructions for execution by the communication device 200, and includes digital or analog communications signals or another intangible medium to facilitate communication of such software. In this regard, a transmission medium in the context of this disclosure is a device-readable medium.

Some embodiments are directed to an apparatus of a user equipment (UE), such as UE 102 (FIG. 1A). In these embodiments, the apparatus may comprise processing circuitry 202 (FIG. 2) and memory associated with the processing circuitry. In these embodiments, the processing circuitry 202 may configure the HE 102 for reporting a channel quality indicator (CQI) index in a channel state information (CSI) reference resource. The processing circuitry 202 may derive the CQI index. To derive the CQI index, the processing circuitry 202 may assume a physical resource block (PRB) bundling size of two PRBs. The processing circuitry 202 may also generate signalling to report the CQI index along with other channel state information. The memory may be configured to store the CQI index.

In some of these embodiments, the processing circuitry 202 may be further configured to generate channel measurements based on channel state information reference signals (CSI-RS) received from a generation node B (gNB). The processing circuitry 202 may further generate a CQI to derive the CQI index, the CQI generated based on the channel measurements and the PRB bundling size. In these embodiments, the UE 102 may measure the channel using the CSI-RS signals transmitted by the gNB. Channel estimation error may be factored in the CQI and may depend on the PRB bundling size. In some cases, the magnitude of the channel estimation error may be reduced as the PRB bundling size is larger (e.g., since more PRBs are used to measure the channel).

In some of these embodiments, the processing circuitry 202 may further be configured to decode radio-resource control (RRC) signaling and configure the UE 102 for CSI reporting, including reporting the CQI index in response to the RRC signaling. In these embodiments, the UE 102 may also be configured by higher layers (i.e., the RRC signalling), although the scope of the embodiments is not limited in this respect.

In some of these embodiments, the processing circuitry 202 may be configured to calculate the CQI for one or more CSI subbands based on an RRC configuration signalled by the gNB A predetermined number of contiguous PRBs may be for estimating channel measurements of a physical downlink shared channel (PDSCH) corresponding to the PRB bundling size to calculate the channel estimation error and generate the CQI. In these embodiments, a number of contiguous PRBs may be assumed for estimating channel measurements of a hypothetical PDSCH corresponding to the PRB bundling size to calculate the channel estimation error and generate the CQI. In these embodiments, based on the assumption of the number of contiguous PRBs for the channel measurements, the UE 102 may derive an expected channel estimation noise power and accounts for this additional noise power in the CQI. The number of contiguous PRBs is not used by the UE 102 for actual channel measurements but is used to derive the expected channel estimation error noise power that should be accounted for in the CQI.

In some of these embodiments, the processing circuitry 202 may decode the RRC signalling to determine a CSI subband size for calculation of the CQI. In these embodiments, the actual. PRBs for which the CQI should be provided is determined by CQI subband size.

In some of these embodiments, the other channel state information that is reported to the gNB may include a rank indicator (RI), a precoding matrix indicator (PMI), and layer indicator (LI), In some of these embodiments, the processing circuitry 202 may be configured to further decode downlink control information (DCI) to determine a precoding resource block group (PRG) size for use in demodulation of a physical downlink shared channel (PDSCH). In some embodiments, the PRG size may be indicated by RRC signalling.

In some of these embodiments, the processing circuitry 202 may be configurable to use a different PRG size for demodulation of the PDSCH than the PRB bundling size used for derivation of the CQI index. In these embodiments, the PRG size for the actual demodulation of the PDSCH is used for channel estimation and indicated to the UE by using RRC signalling or a combination of RRC signalling and DCI signalling. In some embodiments, for the CQI calculation, the UE may assume a PRB bundling size of size 2, irrespective of the actual PRG size indicated to the UE for PDSCH demodulation. For example, the actual PRG size for PDSCH demodulation can be 4, but for CQI index derivation, the UE may use the PRG value of 2 (corresponding to the PRB bundling size). In some of these embodiments, the gNB may adjust the reported CQI if the actual PRG indicated for the PDSCH and assumed PRB bundling size in the CQI calculation are different, although this is not a requirement.

Dynamic Switching of Precoding Granularity
[AA7306-Z] MIMO

Embodiments disclosed herein may be related to multi input multi output (MIMO). A MIMO system relies on plurality of transmit (Tx) and receive (Rx) antennas to provide spatial diversity, multiplexing and array gains in the downlink and uplink channels. In the downlink, the Tx can improve the performance by using channel state information (CSI) about the downlink channel observed by the Rx. The CSI can be obtained by the Tx from the Rx as follows:

From estimation of the uplink channel and by using channel reciprocity of the wireless channel From quantized feedback measured by the Rx.

The quantized form of CSI feedback is more general and can be used for both frequency division duplex (FDD) and time division duplex (TDD) systems. The quantized CSI includes the precoding matrix index (PMI) to assist beamforming or precoding selection at the Tx antennas of the new radio (NR) nodeB (gNB). The set of possible PMIs may be denoted as codebook. For different possible deployments of NR, the codebook may be designed to provide reasonable performance in all possible serving directions of the transmission and reception point (TRP).

Precoding Resource Group (PRG)

In order to improve the performance for DM-RS based transmission mode resource block (RB) bundling may be used. If the UE is configured with PMI/rank indicator (RI) reporting UE may assume the same precoding vector over some of the adjacent RBs. In this case, the channel estimation can be improved by averaging over larger number of the RBs.

Precoding PRB Bundling

A UE configured for transmission mode 9 for a given serving cell c may assume that precoding granularity is multiple resource blocks in the frequency domain when PMI/RI reporting is configured.

For a given serving cell c, if a UE is configured for transmission mode 10 if PMI/RI reporting is configured for all configured CSI processes for the serving cell c, the UE may assume that precoding granularity is multiple resource blocks in the frequency domain, otherwise, the UE may assume the precoding granularity is one resource block in the frequency domain.

Fixed system bandwidth dependent Precoding Resource block Groups (PRGs) of size P' partition the system bandwidth and each PRG consists of consecutive PRBs. If $N_{RB}^{DL}$ mod P'>0 then one of the PRGs is of size $N_{RB}^{DL} - P'\lfloor N_{RB}^{DL}/P'\rfloor$. The PRG size is non-increasing starting at the lowest frequency. The UE may assume that the same precoder applies on all scheduled PRBs within a PRG.

The PRG size a UE may assume for a given system bandwidth may be given by:

TABLE 7.1.6.5-1

| System Bandwidth ($N_{RB}^{DL}$) | PRG Size (P') (PRBs) |
|---|---|
| ≤10 | 1 |
| 11-26 | 2 |

TABLE 7.1.6.5-1-continued

| System Bandwidth ($N_{RB}^{DL}$) | PRG Size (P') (PRBs) |
|---|---|
| 27-63 | 3 |
| 64-110 | 2 |

For download (DL) data transmission:
  PRB bundling size values include
    Case 1: one or more values down-selected from the following set
      ([1], 2, 4, 8 and 16);
      A relationship with RBG size;
    Case 2: values equal to consecutively scheduled bandwidth in frequency;
    For UE-specific PRB bundling size indication, support dynamically indicated PRB bundling size with up to 1 bit overhead;
      Implicit indication to reduce configuration overhead, e.g., based on DMRS configuration etc;
      Usage of above 1 bit, e.g. whether to switch between Case 1 and Case 2 or between two configured Case 1 values;
  Other aspects related to multiuser (MU)-MIMO pairing and higher-layer signaling include the following.
  Embodiments disclosed herein may include pore-coding resource group (PRG) case determination using demodulation reference signal (DM-RS) antenna port indication, where PRG size depends whether the transmission is in single-user (SU)-MIMO or MU-MIMO.
  Embodiments disclosed herein may include PRG assignment to physical resource blocks (PRB) s using indicated/configured PRB index for the lowest PRB or high PRB (not necessarily corresponding to edges of operating UE bandwidths).
  In addition, embodiments disclosed herein may include PRB bundling size assumption(s) for Channel Quality Indicator (CQI) calculation at the UE.

First Embodiments

One of the open issue of PRG support is dynamic switching between two PRG size cases. Since the main motivation of supporting dynamic switching is support of SU-MIMO and MU-MIMO switching, the switching of PRG size can be performed implicitly by using DM-RS antenna port indication.

In particular, If DM-RS antenna ports indicated for the UE does not include other co-scheduled DM-RS antenna ports, UE may assume PRG size equal to the all contiguously scheduled PRBs. PRG size is equal to high layer configured value in case other DM-RS antenna ports are present.

To support diversity transmission, the fall-back model may assume PRG equal to 1 PRB as default value.

Second Embodiments

In LTE the PRO may be assigned starting from the lowest PRB index. In NR, due to support of wideband system operation, different UE may have different bandwidth assumption. As the result, the PRG assignment to PRBs may be mismatched for different UEs. As the result, when MU-MIMO is considered and resource allocation type 0 is used, UE may not be able to take advantage of the larger PRG size. To overcome the issue of PRO assignment mismatch for different UEs, a PRB assignment procedure may be performed to PRG starting from the certain PRB index indicated to the UE by the NW. The indicated or implicitly derived PRB indexes corresponds to PRB index with the lowest frequency (PRB_min) and highest frequency respectively (PRB_max) and may not be the same as PRBs corresponding to the lowest and highest frequency of the UE's bandwidth. UE may use indicated PRB indices to assign the PRO using similar procedure as in LTE, i.e. starting from the PRB index corresponding to lower frequency or from the PRB index corresponding to the highest frequency. If the number of PRBs determined by PRB_max PRB_min is not integer multiple of PRG size, the last PRO has lower size in PRBs.

Third Embodiments

Embodiments also include PRB bundling size assumption for CQI calculation at the UE. In a first example, for CSI reference resource definition, a UE may assume the predetermined PRB bundling size. The predetermined value can be the lowest PRB bundling size, i.e. 2 PRBs or any other PRB bundling size supported by NR, i.e. 2, 4, 8 or all contiguous PRBs in the resource allocation. The predetermine value can be configured by gNB or defined in the specification. In other embodiments, the PRB bundling size may correspond to the bundling size indicated by the gNB in the scheduling DCI. In a second example, the PRB bundling size may depend on the granularity of the CSI report. In particular, WPM' report is configured as subband, the PRB bundling size may be determined from a subband size of the subband. If the PMI report is wideband, the PRB bundling size may be equal to all contiguous PRBs. In other embodiments, the PRB bundling may also be determined from resource block group (RBG) size configured for the UE for DL reception.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus comprising:
  a processor, where the processor is configured to cause a user equipment (UE) to:
    configure the UE for reporting channel state information (CSI) including a channel quality indicator (CQI) information;
    process a CSI reference resource received from a next generation Node B (gNB);
    perform a CQI calculation, wherein to perform the CQI calculation, the processor is configured to assume a physical resource block (PRB) bundling size of two PRBs in the CSI reference resource;
    generate a report to report the CQI information based on the CQI calculation; and
    generate signalling to transmit the report to the gNB.

2. The apparatus of claim 1, wherein the processor is further configured to assume the PRB bundling size in the CSI reference resource to derive a precoding matrix indicator (PMI) and a rank indicator (RI) for reporting in the report.

3. The apparatus of claim 2, wherein the processor is further configured to decode radio-resource control (RRC) signaling and configure the UE for CSI reporting and reporting the CQI information.

4. The apparatus of claim 3, wherein the processor is configured to:
- calculate the CQI for one or more CSI subbands based on an RRC configuration signalled by the gNB, and
- use a predetermined number of contiguous PRBs for estimating channel measurements of a physical downlink shared channel (PDSCH) corresponding to the PRB bundling size to calculate a channel estimation error and generate the CQI.

5. The apparatus of claim 4, wherein the processor is configured to decode the RRC signalling to determine a CSI subband size for calculation of the CQI.

6. The apparatus of claim 1, wherein the processor is further configured to derive a CQI index for each CQI value to be reported.

7. The apparatus of claim 1, wherein the report is generated to further include a rank indicator (RI), a precoding matrix indicator (PMI), and layer indicator (LI).

8. The apparatus of claim 1, wherein the processor comprises a baseband processor.

9. A non-transitory computer-readable storage medium that stores instructions for execution by a processor of a user equipment (UE) to configure the UE for reporting channel state information (CSI) including a channel quality indicator (CQI) information, wherein the instructions are executable by the processor to:
- process a CSI reference resource received from a next generation Node B (gNB);
- perform a CQI calculation, wherein to perform the CQI calculation, the processor is configured to assume a physical resource block (PRB) bundling size of two PRBs in the CSI reference resource;
- generate a report to report the CQI information based on the CQI calculation; and
- encode the report for transmission to the gNB.

10. The computer-readable storage medium of claim 9, wherein the instructions are further executable to assume the PRB bundling size in the CSI reference resource to derive a precoding matrix indicator (PMI) and a rank indicator (RI) for reporting in the report.

11. The computer-readable storage medium of claim 10, wherein the instructions are further executable to decode radio-resource control (RRC) signaling and configure the UE for CSI reporting and reporting the CQI information.

12. The computer-readable storage medium of claim 11, wherein the instructions are further executable to:
- calculate the CQI for one or more CSI subbands based on an RRC configuration signalled by the gNB, and
- use a predetermined number of contiguous PRBs for estimating channel measurements of a physical downlink shared channel (PDSCH) corresponding to the PRB bundling size to calculate a channel estimation error and generate the CQI.

13. The computer-readable storage medium of claim 12, wherein the instructions are further executable to decode the RRC signalling to determine a CSI subband size for calculation of the CQI.

14. The computer-readable storage medium of claim 9, wherein the instructions are further executable to derive a CQI index for each CQI value to be reported.

15. The computer-readable storage medium of claim 9, wherein the report is generated to further include a rank indicator (RI), a precoding matrix indicator (PMI), and layer indicator (LI).

16. A user equipment (UE), the comprising:
- wireless communication circuitry; and
- one or more processors coupled to the wireless communication circuitry, wherein the one or more processors are configured to cause the UE to:
  - process a CSI reference resource received from a base station;
  - perform a CQI calculation, wherein deriving the CQI calculation includes assuming a physical resource block (PRB) bundling size of two PRBs in the CSI reference resource;
  - generate a report to report the CQI information based on the CQI calculation; and
  - encoding the report for transmission to the base station.

17. The UE of claim 16, wherein the one or more processors are further configured to assume the PRB bundling size in the CSI reference resource to derive a precoding matrix indicator (PMI) and a rank indicator (RI) for reporting in the report.

18. The UE of claim 16, wherein the one or more processors are further configured to derive a CQI index for each CQI value to be reported.

19. The UE of claim 16, wherein the one or more processors are further configured to:
- decode radio-resource control (RRC) signaling and configure the UE for CSI reporting and reporting the CQI calculation;
- calculate the CQI for one or more CSI subbands based on an RRC configuration signalled by the base station; and
- use a predetermined number of contiguous PRBs for estimating channel measurements of a physical downlink shared channel (PDSCH) corresponding to the PRB bundling size to calculate a channel estimation error and generate the CQI.

20. The UE of claim 19, wherein the one or more processors are further configured to decode the RRC signalling to determine a CSI subband size for calculation of the CQI.

* * * * *